United States Patent

[11] 3,532,187

[72] Inventor James M. Herring, Jr.
 Merion Station, Pennsylvania
[21] Appl. No. 787,891
[22] Filed Dec. 30, 1968
[45] Patented Oct. 6, 1970
[73] Assignee The Budd Company
 Philadelphia, Pennsylvania
 a corporation of Pennsylvania

[54] STABILIZER BRAKE APPARATUS
 5 Claims, 3 Drawing Figs.
[52] U.S. Cl. ..................................... 188/2,
 188/162, 280/6
[51] Int. Cl. ..................................... B60t 1/12
[50] Field of Search ............................ 188/1, 2,
 162; 280/6, 47.15, 6.1, 6.11, 124

[56] References Cited
 UNITED STATES PATENTS
 2,471,857 5/1949 Bleakney et al. .......... 188/1
 3,131,950 5/1964 Weaver et al. ............ 280/6
 3,278,197 10/1966 Gerin ..................... 280/124

Primary Examiner—Duane A. Reger
Attorneys—Thomas I. Davenport, Edward M. Farrell, Alford L. Trueax, Jr. and William R. Nolte ABSTRACT: This invention relates to a front axle pivot stabilizer and brake for a ground vehicle. The vehicle includes a chassis and an axle pivotally mounted at its center. Relative movement between the axle and the chassis is accommodated by rotational movement of a shaft in a sleeve through a ball screw assembly. Relative movement between the axle and chassis may be arrested by biasing means coacting with an end of the shaft thereby preventing movement of the shaft and pivotal movement of the axle.

Patented Oct. 6, 1970

INVENTOR.
JAMES M. HERRING, JR.
BY
William R. Nolte
AGENT

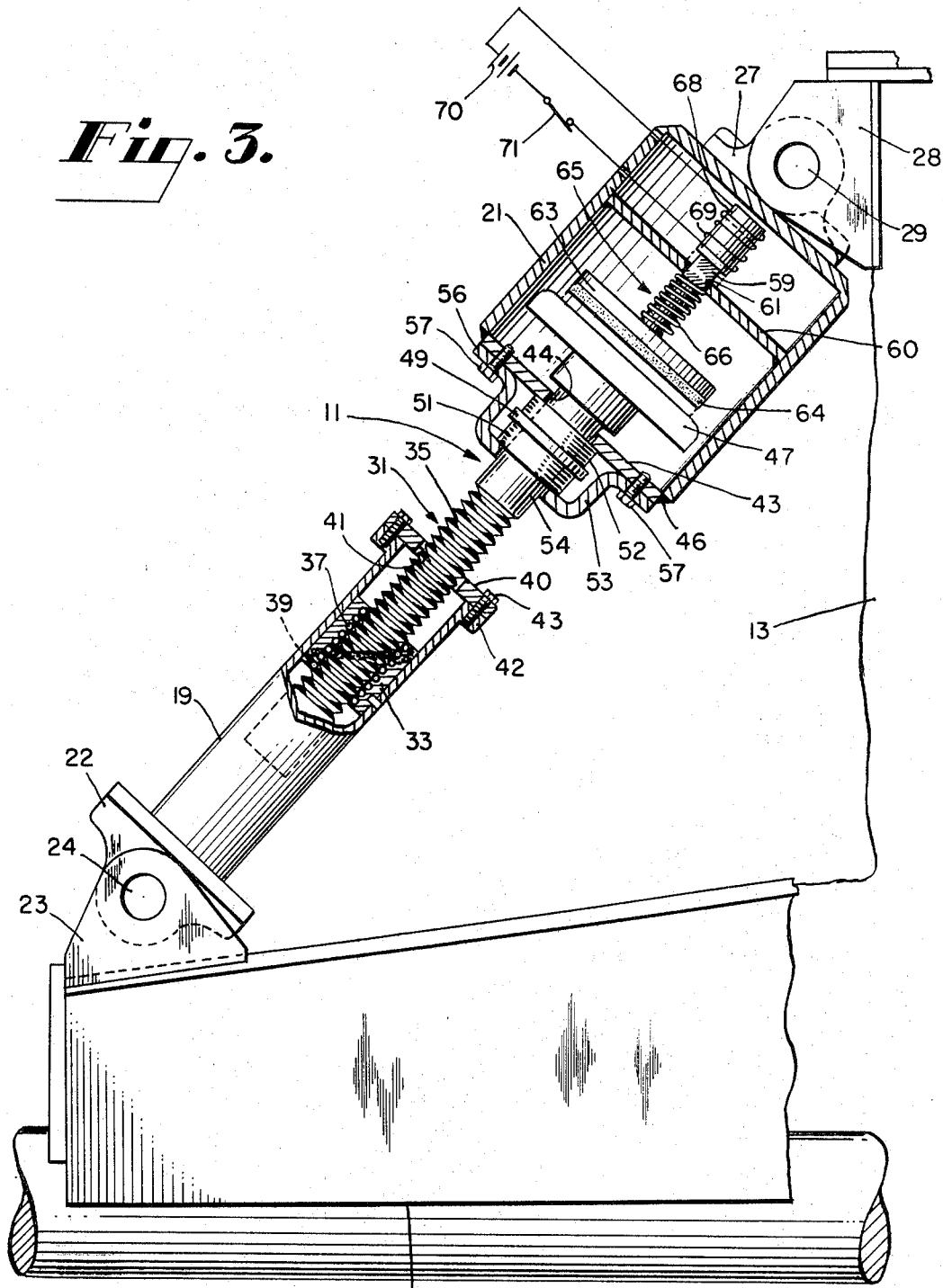

ial movement by means of spaced bearing plate 60 with a matching square aperture affixed to the wall surfaces of the bore within casing 21. The lower end of the plunger includes an enlarged head 63 which in turn has mounted on its lower surface a brake lining 64 in the form of a pad to engage the upper friction surface of disc 47. Biasing means 65 are provided to nor-

STABILIZER BRAKE APPARATUS

A vehicle of this type is shown in my co-pending application entitled "Aircraft Transfer Vehicle", Ser. No. 762,443, filed Sept. 25, 1968 and assigned to the same assignee as the present invention. Such vehicles include chassis means, a front axle pivotally mounted at its center to the chassis, a pair of spaced upright lifting post means affixed to the chassis, and pod means for carrying passengers mounted for movement on the upright posts. The vehicle is designed for transporting passengers between an airport terminal area and an aircraft field location. The passenger pod means are capable of being elevated to the floor level of most present and proposed aircraft and the second level of most airport terminals. The vehicle normally travels between the terminal building and the parked aircraft with its pod in the down position. Prior to elevating the pod on the upright lifting posts it is desirable to stabilize the movement of the pivotal front axle relative to the chassis.

In accordance with one aspect of the present invention, a novel front axle stabilizer is provided which minimizes movement of the chassis frame. With the present arrangement, the front axle is permitted to rotate relative to the chassis when the vehicle is running over uneven or sloping ground. Upon the vehicle reaching its destination, the front axle may be stabilized to prevent relative movement between it and the chassis. This eliminates vibrations and skewing of the lifting posts. The passenger pod may thereby be elevated on the posts without binding on the posts.

Accordingly it is a principal object of this invention to provide improved stabilizer brake apparatus for a ground vehicle.

Another principal object of this invention is to provide improved stabilizer brake apparatus for a vehicle wherein the length of the apparatus may be selectively adjusted.

In accordance with the invention, the stabilizer brake apparatus for a vehicle comprises first housing means, ball screw means including a shaft mounted for axial movement in said housing, and second housing means aligned with said first housing means. The shaft includes a portion extending into said second housing, and bearing means are provided to mount said shaft for rotation in said second housing means. Biasing means mounted in said second housing means normally urge brake means into coacting engagement with a portion of said shaft to preclude rotation of said shaft. Means cooperating with said biasing means are also provided to selectively move the brake means out of engagement with said portion of said shaft against the urging of said biasing means to free said shaft for rotation.

For a better understanding of the present invention together with other and further objects thereof, reference is had to the following description taken in connection with the accompanying drawings and its scope will be pointed out in the appended claims.

In the drawings:

FIG. 3 is a sectional view, partially schematic and greatly enlarged, taken along the lines 3–3 of FIG. 1.

Figure 1:
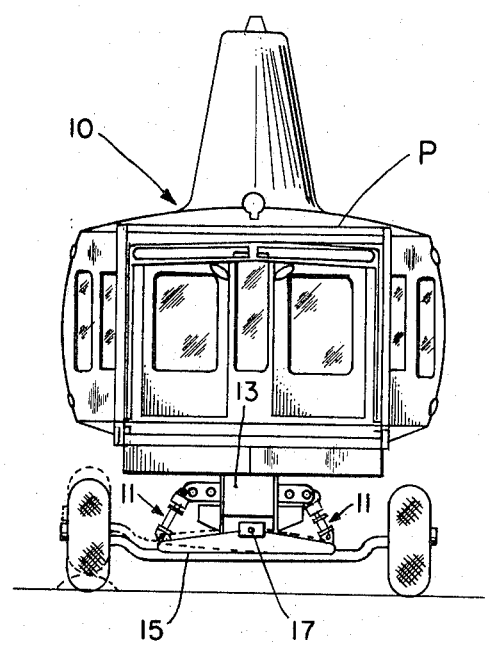
FIG. 1 is a front elevational view of an aircraft passenger ground vehicle embodying the present invention.
Figure 2:
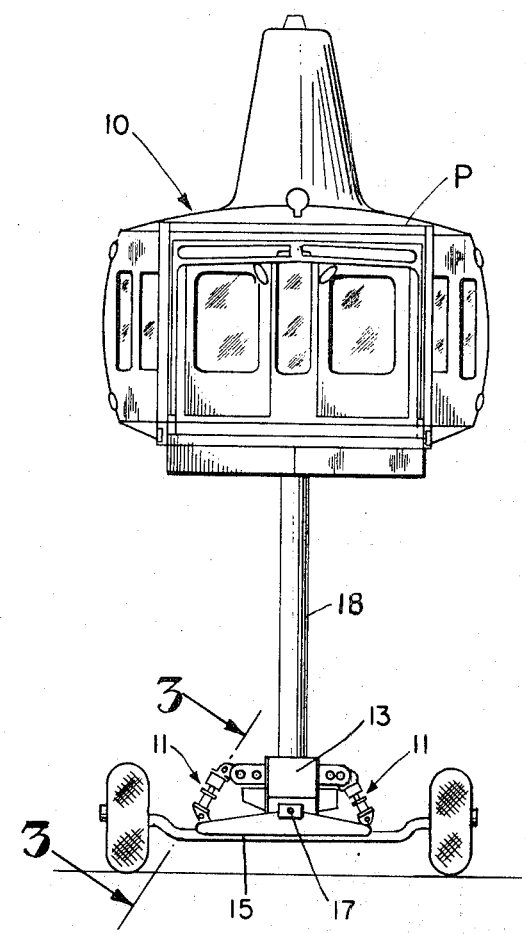
FIG. 2 is a front elevational view of the vehicle shown in FIG. 1 with the passenger pod of the vehicle in its raised position.

Referring to FIGS. 1 and 2 of the drawings there is shown an aircraft passenger carrying ground vehicle 10 employing the stabilizer brake apparatus 11 of the present invention. The vehicle may be of the type previously referred to which includes a chassis 13, and a front wheel axle unit 15 pivoted to the chassis as by pivot 17. A unit stabilizer brake apparatus 11 is disposed on each side of the pivot and extends diagonally upwardly and inwardly from an outboard location on the wheel axle unit to a side of the chassis. The chassis includes an upright lifting pole 18 which accommodates vertical movement of the passenger pod P. The vehicle 10 is of the type to transfer passengers between an airport terminal and parked aircraft. Its pod P is capable of being elevated as seen in FIG. 2 by means not forming part of this invention to the level of most present and proposed aircraft and the second level of most present and proposed airport terminals to accept and discharge passengers. The vehicle however normally travels with the pod in its down position, and elevates the pod to load and unload passengers from the aircraft or terminal. In order to stabilize the front axle unit 15 against vibration and pivotal movement before the passenger pod is raised to mate with a passenger airplane, the front axle unit is blocked by the stabilizer brake apparatus 12 of the present invention.

Referring now to FIG. 3 the stabilizer brake apparatus 11 is in the form of a fail safe lock strut and consists of a first cylindrical sleeve 19 axially aligned with a second cylindrical sleeve 21. The lower sleeve 19 includes a hinge ear 22 which is received in a bracket 23 and suitably connected as by a pivot pin 24. The bracket 23 is affixed to the axle unit 15. The upper end of the upper sleeve 21 likewise includes a hinge ear 27 which is received by a bracket 28 and connected thereto as by pivot pin 29, the latter bracket being suitably affixed to the aforementioned chassis 13. The two cylindrical sleeve portions 19, 21 are telescopically connected by means of screw means 31. The screw means include a nut portion 32 received within the casing 19 and fixed thereto. The nut 33 includes a helical groove machined therein and within which a helically grooved drive shaft 35 rotates. The opposing grooves in the nut 33 and in the drive shaft 35 form a raceway which is part of a closed circuit through which a plurality of rolling balls 37 recirculate continually. An internal passageway 39 in the nut 33 communicates with the two extremities of the raceway and completes the closed circuit near the lower end of the drive shaft 35. The upper end of the casing 19 includes a cover 40 having an aperture 51 to receive the threaded shaft 35. The cover 40 is suitably bolted to flange 42 affixed to the outer upper periphery of the casing as by bolts 43.

The lower end of the upper casing 21 includes an end plate 43 apertured as at 44 to receive the upper end of the shaft 35. The end plate 43 may be welded to the side walls of the casing 21 as at 46. The upper outer extremity of the shaft 35 includes an enlarged brake disc portion 47 which rotates within the casing 21. The shaft 35 in addition includes a shoulder or disc-like boss 49 externally beneath the end plate 43. A pair of thrust bearing elements 51, 52 are disposed on opposite sides of the boss 49 and are received within a cup shaped retainer 53 which is apertured as at 54 to permit rotation of the shaft 35. The cup shaped member 53 includes a flanged portion 56 which is suitably bolted as at 57 to end plate 43. The bearings 51, 52 cooperating with the shoulder 49 and with the cup 53 enable rotational movement of shaft 35 but at the same time prevent axial movement of the shaft relative to the casing 21.

With reference now to FIG. 1 and as previously stated, the passenger vehicle 10 normally travels across ground surface with the pod P in its lower position as shown. The brake stabilizer apparatus 11 is in the form of a strut which can change its length as a result of slope or unevenness of the ground which may be encountered. By way of example, the axle unit 15 may assume the dotted line position as shown in FIG. 1 if the same travels over some obstruction. In this manner the stabilizer apparatus 11 on the left hand side of the vehicle as viewed in FIG. 1 assumes a shorter overall length. This change in length may be accommodated by telescopic movement of shaft 35, FIG. 3, in the nut 33 which is fixed in casing 19. When it is desired to elevate the pod P on the lifting poles of the chassis 13 as illustrated in FIG. 2 of the drawing, it is necessary that the front axle unit 15 be restrained against pivotal movement. For this purpose the stabilizer brake apparatus is provided with means to prevent it from changing its length. To accomplish this the brake means 57 are provided with a plunger 59 of square cross section and which is mounted for axial movement by means of spaced bearing plate 60 with a matching square aperture affixed to the wall surfaces of the bore within casing 21. The lower end of the plunger includes an enlarged head 63 which in turn has mounted on its lower surface a brake lining 64 in the form of a pad to engage the upper friction surface of disc 47. Biasing means 65 are provided to normally urge the plunger and carrying the brake pad into engagement with the disc 47. For this purpose the biasing means are shown as comprising a coil spring 66 which encircles the plunger shaft 59. The lower end of the spring engages the enlarged head 63 integral with the plunger 59 while the upper end of the spring reacts against the bearing plate 60. The upper end of the plunger 59 includes an upper enlarged end portion 68 having high magnetic properties as is well known and which is encircled by a coil 69 shown schematically. The coil includes leads which in turn are connected to receive current from a suitable power source 70 which may be a battery. A switch 71 is included in the leads which when closed enables current to be received by the coil 69 to energize the same. The plunger which is encircled by the coil is actuated in a manner to overcome the bias of spring means 66. The head or brake shoe affixed to the lower end of the plunger is thereby moved out of contact with the brake disc 47. Thus when the switch 71 is manually closed by the operator of the vehicle the shaft 35 is free to rotate and move telescopically within casing 19 as a result of pivotal movement of the axle unit about its pivot in chassis 13. However, when it is desired to elevate the pod it is necessary to restrain the axle unit against pivotal movement. The switch 71 in this case is then opened to enable the biasing means to move the brake shoe into engagement with the brake disc 47, thereby preventing change of length of the strut. It will be noted that the electrical circuit is such that in the event of loss of electrical current 70 the brake will operate in a fail safe manner, since the biasing spring 66 will move brake head 33 into engagement with disc 47 to lock shaft 35.

While there has been described what at present is considered to be the preferred embodiment of this invention it will be obvious to those skilled in the art that various changes and modifications may be made therein without departing from the invention, and it is therefore aimed in the appended claims to cover all such changes and modifications as fall within the true spirit and scope of this invention.

I claim:

1. Stabilizer brake apparatus for a ground passenger carrying vehicle having a chassis and an axle pivoted thereto, comprising in combination, first housing means pivoted to said axle, second housing means pivoted to said chassis, ball sleeve means mounted in said first housing means, screw means mounted for axial movement in said ball sleeve means and having a portion extending within and journalled for rotation in said second housing means, and biasing means selectively engageable with said portion of said screw means to arrest said screw means against movement of said axle.

2. In the stabilizer brake apparatus as set forth in claim 1 wherein said first and said second housing means are axially aligned and spaced from one another.

3. In the stabilizer brake apparatus as set forth in claim 2, said shaft means including a disc portion first and second bearing means encircling said shaft and disposed on opposite sides of said disc portion and means securing said first and second bearing means in said second housing means against axial movement.

4. In the apparatus as set forth in claim 3 wherein said portion of said screw includes a friction surface and wherein said biasing means includes a brake lining means for engagement therewith.

5. In the apparatus as set forth in claim 4 and including solenoid means cooperable with said biasing means for moving the same out of engagement with said portion of said screw means to enable rotation of said screw means upon pivotal movement of said axle.